(12) United States Patent
Van Oost et al.

(10) Patent No.: US 10,749,749 B2
(45) Date of Patent: Aug. 18, 2020

(54) AUTOMATIC CONFIGURATION OF A WIRELESS RESIDENTIAL ACCESS NETWORK

(71) Applicant: THOMSON Licensing, Issy-les-Moulineaux (FR)

(72) Inventors: Koen Van Oost, Borsbeek (BE); Stijn Segers, Lint (BE); Frederik Verwaest, Mol (BE)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 199 days.

(21) Appl. No.: 15/561,049

(22) PCT Filed: Mar. 17, 2016

(86) PCT No.: PCT/EP2016/055838
§ 371 (c)(1),
(2) Date: Sep. 23, 2017

(87) PCT Pub. No.: WO2016/150817
PCT Pub. Date: Sep. 29, 2016

(65) Prior Publication Data
US 2018/0077022 A1    Mar. 15, 2018

(30) Foreign Application Priority Data
Mar. 23, 2015  (EP) ................................. 15305417

(51) Int. Cl.
*H04L 12/24* (2006.01)
*H04L 29/06* (2006.01)
(Continued)

(52) U.S. Cl.
CPC ...... *H04L 41/0886* (2013.01); *H04L 41/0806* (2013.01); *H04L 63/0876* (2013.01);
(Continued)

(58) Field of Classification Search
CPC . H04L 41/0886; H04L 41/0806; H04L 41/28; H04L 41/0213; H04L 63/101;
(Continued)

(56) References Cited

U.S. PATENT DOCUMENTS

| | | | |
|---|---|---|---|
| 6,453,159 B1 * | 9/2002 | Lewis | H04L 63/0428 455/411 |
| 8,743,778 B2 * | 6/2014 | Gordon | H04L 63/06 370/328 |

(Continued)

FOREIGN PATENT DOCUMENTS

| | | |
|---|---|---|
| CN | 101262670 A | 9/2008 |
| CN | 103974230 A | 8/2014 |

(Continued)

OTHER PUBLICATIONS

Anonymous, "CPE WAN Management Protocol", Broadband Forum, Technical Report TR-069, No. 1, Amendment 5, CWMP Version: 1.4, Nov. 2013; pp. 1-228.

(Continued)

*Primary Examiner* — Ruolei Zong
(74) *Attorney, Agent, or Firm* — Volpe and Koenig, P.C.

(57) ABSTRACT

A method (30) and system (10) for automatically configuring wireless local area network (WLAN) devices (21, 22, 23) of a wireless residential access network (20) is provided. An automatic authorization process initiated by an access point (21) is enabled by utilizing a back-end-network (40, 50) and results in the activation of a basic service set identifier (BSSID) based on which auto-pairing of at least one station (22) with the access point (21) is realized. An automatic authentication process of the at least one station (22) is enabled based on a comparison of an identification provided by the station (22) against a list of unique device identifiers installed in the access point (21) during the automatic authorization process. The authentication process results in granting or denying access to the residential access network (20) for the at least one station (22).

6 Claims, 9 Drawing Sheets

(51) Int. Cl.
*H04W 12/08* (2009.01)
*H04W 48/16* (2009.01)
*H04W 84/12* (2009.01)
*H04W 12/00* (2009.01)

(52) U.S. Cl.
CPC ............ *H04L 63/101* (2013.01); *H04W 12/08* (2013.01); *H04W 48/16* (2013.01); *H04L 41/0213* (2013.01); *H04L 41/28* (2013.01); *H04W 12/00512* (2019.01); *H04W 12/00516* (2019.01); *H04W 84/12* (2013.01)

(58) Field of Classification Search
CPC ............. H04L 63/0876; H04L 63/0281; H04L 61/3075; H04L 2209/80; H04W 12/08; H04W 12/00516; H04W 12/00512; H04W 12/06; H04W 48/16; H04W 84/12
USPC ......................................................... 709/220
See application file for complete search history.

(56) References Cited

U.S. PATENT DOCUMENTS

| | | | | |
|---|---|---|---|---|
| 2006/0039339 | A1* | 2/2006 | Cohen | H04L 63/04 370/338 |
| 2007/0081477 | A1 | 4/2007 | Jakkahalli et al. | |
| 2008/0220741 | A1* | 9/2008 | Hung | H04W 12/06 455/411 |
| 2008/0320108 | A1* | 12/2008 | Murty | H04W 48/20 709/220 |
| 2013/0019298 | A1* | 1/2013 | Jover Segura | H04L 63/101 726/7 |
| 2013/0318587 | A1* | 11/2013 | Shamsspoor | H04W 12/06 726/7 |
| 2015/0350911 | A1* | 12/2015 | Pallen | H04W 12/08 726/3 |

FOREIGN PATENT DOCUMENTS

| | | |
|---|---|---|
| EP | 1520375 | 12/2009 |
| EP | 2477361 | 7/2012 |
| IN | 201202521 | 10/2013 |
| WO | 1806897 | 7/2007 |
| WO | WO2012084626 | 6/2012 |

OTHER PUBLICATIONS

Anonymous, "Internet Gateway Device Data Model for TR-069", Broadband Forum, Technical Report TR-098, No. 1, Amendment 2, Sep. 2008, pp. 1-239.

Anonymous, "Internet Gateway Device Data Model for TR-069", Broadband Forum, Technical Report TR-098, No. 1, Amendment 2, Corrigendum 1, Dec. 2014, pp. 1-48.

Rigney et al., "Remote Authentication Dial in User Service (RADIUS)", Network Working Group, Request for Comments: 2865, Jun. 2000, pp. 1-67.

Anonymous, "VDSL2 Performance Test Plan", Broadband Forum, Technical Report TR-114, No. 2, Nov. 2012, pp. 1-182.

Anonymous, "Device Data Model for TR-069", Broadband Forum, Technical Report TR-181, No. 2, Amendment 8, Sep. 2014, pp. 1-141.

* cited by examiner

AUTOMATIC CONFIGURATION OF A WIRELESS RESIDENTIAL ACCESS NETWORK

This application claims the benefit, under 35 U.S.C. § 365 of International Application PCT/EP2016/055838, filed Mar. 17, 2016, which was published in accordance with PCT Article 21(2) on Sep. 29, 2016, in English, and which claims the benefit of European Patent Application No. 15305417.6 filed Mar. 23, 2015.

TECHNICAL FIELD

The invention generally relates to wireless local area network (WLAN) device management techniques, specifically focused on the configuration of WLAN devices and, more particularly, to a method and system for automatically configuring all WLAN devices of a wireless residential access network.

In this specification the expression "service set" refers to set consisting of all the devices associated with a consumer or enterprise IEEE 802.11 wireless local area network (WLAN). The expression "basic service set" (BSS), in infrastructure mode, refers to a single access point (AP) together with all associated stations (STAs). Each BSS is identified by a service set identifier (SSID).

BACKGROUND

In the past a telecom operator provided the broadband access gateway, providing residential users access to the broadband network of the telecom operator. In modern residential network architecture the telecom operator is now also installing pure local area network (LAN) devices in the residential environment, hence, creating a residential access network.

Today telecom operators differentiate themselves amongst each other as service providers, whereby they not only deliver the broadband access service but also services like, for example, but not limited to, voice over internet protocol (VoIP), internet protocol television (IPTV), video on demand (VoD), or home security. To enable these services a residential access service network is mandatory. A residential access network is a network that is either owned by the telecom operator or where the end user is obliged to purchase networking equipment from the telecom operator as the hardware (HW) and software (SW) are optimized to deliver the service set that is offered by the operator.

The operation and maintenance (OAM) of such a residential access network is a substantial cost for the telecom operator and, hence, depending on the complexity of the installation the telecom operator resorts to "do it yourself" (DIY) installation procedures. For many end users this practice is acceptable, but there is still a large portion of the customer base where the end user is unable to complete the install, hence, requiring onsite assistance, which is costly for both the telecom operator as well as the end user.

For WLAN, the most applicable installation methods today include Wi-Fi protected setup (WPS) and manual installation of security credentials via a user manual. WPS, though technically viable, is still unknown to the larger public and still has shortcomings in terms of security and usability. For example, the push button configuration method can allow accidental pairing of an undesired device or the WPS state machines signal their state via a LED framework which is not understood by end users facing issues. Manual configuration via mobile applications or a graphical user interface (GUI) is not easy for the end user community as this requires the devices to be configured offline via a PC with Ethernet for instance. As today the majority of end users don't even know how to use Ethernet or how to assign fixed IP addresses, this can be a cumbersome activity.

With more and more telecom operators requiring the installation of a residential access network there is more and more pressure to relieve the end user from having to correctly install the devices of such a network, such as, for example, an access point (AP), a station (STA), and/or a repeater (RE). While pairing two WLAN devices is not that difficult, it turns out that WLAN configuration issues still account for a relatively big portion of the total amount of helpdesk calls that arrive at a telecom operator. The cumbersome part is that either an end user has to arrange access of some form to the devices to fill in the security credentials, such as, for example, service set identifier (SSID), Wi-Fi protected access with a pre-shared key (WPA PSK) or a passphrase, or Wi-Fi protected setup (WPS) must be used. While it is relatively easy to use WPS for pairing of WLAN devices, it remains a fact that the protocol itself remains unpopular and even unknown to the majority of end users. Furthermore, the WPS protocol is still error prone and cumbersome. For instance, if an end user launches a push-button configuration action (PBC) an undesired device, for example, from another end user busy with the same action, might connect or there can be session overlaps with other devices.

European Patent EP 1 520 375 B1 is directed to increasing the security of wireless networks and provides a system and method for detecting unauthorized wireless access points. Unauthorized wireless access points are detected by configuring authorized access points and mobile units to listen to all wireless traffic in its cell and report all detected wireless devices to a monitor. The monitor checks the reported devices against a list of authorized network devices. If the reported wireless device is not an authorized device, the monitor determines if the reported device is connected to the network. If the reported device is connected to the network and is not an authorized device, the monitor alerts the network operator or network manager of a rogue device connected to the network and attempts to locate and isolate the rogue device.

International patent application publication WO 2012/084626 A1 is directed to a method for inter-domain communications between end network domains through an intermediate network domain, and provides a method for explicitly notifying the intermediate network domain border router to the end network domains border routers about its relay capabilities.

Indian Patent application publication IN 2012 202521 P4 provides a method, device, and system for automatic internet protocol (IP) address assignment. An IP address auto configuration protocol is used to remotely and automatically configure an IP address. A bearer network may be Layer 3 IP network, and the Layer 3 IP network only needs to be configured with simple route information.

Still, the known prior art does not provide a telecom operator with a mechanism to establish a residential access network without end user interaction that has a low cost operation and maintenance.

SUMMARY

With more and more telecom operators requiring the installation of a residential access network there is more and more pressure to relieve an end user from having to correctly install the devices of such a network. Embodiments of the invention provide, based on the existence of WAN configuration protocols (e.g. wide area management protocol TR-069 or simple network management protocol (SNMP)) and various information data bases owned by a telecom operator, a self-install mechanism for the wireless residential access network.

It is an advantage of embodiments of the invention that devices of a wireless residential access network are authenticated in the network by the telecom operator rather than via end user interaction. In this way, an end user can acquire any wireless networking device from the telecom operator. A simple power on action is the only DIY action that is required from the end user. The configuration and authentication mechanism will hence mimic a behavior similar to the automatic installation or provisioning of the broadband access gateway which is already the case today for most telecom operators.

Accordingly, embodiments of the invention eliminate any form of installation action to be performed by the end user other than switching the wireless networking device on. No service technician needs to go onsite and end users are not required to be familiar with networking or with WLAN. The wireless residential access network enabled in accordance with embodiments of the invention will be fully provisioned by the telecom operator.

The proposed concept leverages on the fact that a telecom operator owns an end user database and on the fact that there is a variety of remote management protocols available to configure telecom operator owned requirement, such as, for example, TR-069 or SNMP.

It is a further advantage of embodiments of the invention that such a residential access network is more advanced and less error prone than existing mechanisms and that the operation and maintenance (OAM) of such a residential access network is cost effective for the telecom operator.

According to the advantageous embodiments of the invention, a method for automatically configuring wireless local area network (WLAN) devices of a wireless residential access network is disclosed. The method comprises: establishing a wireless residential access network including an access point (AP) and a station (STA); sending out periodical probe requests with the station to connect to a preconfigured service set identifier (SSID); receiving the probe requests with the access point; starting an authorization process by communicating the request of the station to a back-end-network with the access point; programming the access point with a list of unique device identifiers using the back-end-network thereby identifying devices allowed on the residential access network; activating a basic service set identifier (BSSID) with the access point; enabling the preconfigured service set identifier (SSID) with the access point and automatically pairing the station with the access point; communicating an identification of the station from the station to the access point thereby starting an authentication process; validating the identity of the station with the access point by comparing the identification of the station with the list of unique device identifiers; authorizing connection of the station with the residential access network within a configurable response window with the access point; and automatically connecting the station with the residential access network.

Generally in WLAN networks there is no extra authorization as it is assumed that the manual action of the end user is a form of authorization. Thus, it is advantageous that with the provided automatic installation in accordance with an embodiment of the invention the need of manual end user interaction to perform some form of authorization can be eliminated. The automatic authorization allows to avoid pairing devices from a different residential access network, for example the network of a neighbor, with the access point and, thus the broadband gateway of a current network, which otherwise could lead to an issue or misconfiguration in the current residential access network.

Performing an automatic authentication process in accordance with an embodiment of the invention is advantageous since it may prevent a typical so-called "honey pot" attack, where a rogue access point of an attacker mimics the access point of the current residential access network, thereby allowing one or more stations that do not belong to the operator of the current residential access network, such as a neighbors' station, to automatically connect to the rogue access point.

According to preferred embodiments of the invention, the method further includes declining connection of the station upon failure of validating the identity of the station; automatically disconnecting the station from the access point; and blacklisting the basic service set identifier (BSSID).

According to preferred embodiments of the invention, the method further includes sending out probe requests only when there is no other connection profile present in the station.

According to preferred embodiments of the invention, the method further includes starting the authorization procedure upon reception of at least five consecutive probe requests from the station.

According to preferred embodiments of the invention, the method further includes providing all networking devices by an operator of the residential access network and equipping all networking devices with an operator specific software code optimized to deliver services offered by the operator.

According to preferred embodiments of the invention, the method further includes adding an additional station and/or a repeater to the residential access network.

According to preferred embodiments of the invention, the method further includes operating the SSID as a non-broadcasting or hidden network. This is advantageous since it provides that the SSID will not be visible on simple network scanners and create confusion during connection of regular, non-operator owned equipment, such as end user devices.

According to preferred embodiments of the invention, the method further includes providing the identification of the station in form of a serial number.

According to preferred embodiments of the invention, the method further includes providing the list of unique device identifiers as a list of media access control (MAC) addresses of serial numbers.

According to preferred embodiments of the invention, the method further includes eliminating any form of installation action to be performed by an end user other than powering the wireless networking device on.

According to preferred embodiments of the invention, the method further includes providing all networking devices of the residential access network as identical devices, wherein each of the identical devices can assume a different operational role. This embodiment is advantageous since it allows to keep the cost for the operator of the residential access network low, as well as the cost of the equipment manufacturer!

According to preferred embodiments of the invention, the method further includes utilizing action frames in the authentication process to present the identity of the station and to grant or deny access to the residential access network for the station.

According to preferred embodiments of the invention, the method further includes utilizing Wi-Fi protected access (WPA2) enterprise with a protected extensible authentication protocol (PEAP) to gain access to the residential access network.

According to the advantageous embodiments of the invention, a system for automatically configuring wireless local area network (WLAN) devices of a wireless residential access network is disclosed. The system comprises a wireless residential access network including an access point and at least one station, wherein the access point is connected via a broadband link with a broadband gateway (BBGW), and wherein the access point, the at least one station, and the broadband gateway are provided by an operator of the residential access network; a back-end-network accessible for the broadband gateway; wherein the back-end-network enables an automatic authorization process initiated by the access point, which results in the activation of a basic service set identifier (BSSID) based on which maintenance or auto-pairing of the at least one station is implemented; wherein an authentication process of the at least one station is enabled based on a comparison of an identification provided by the station and a list of unique device identifiers installed in the access point during the automatic authorization process, the authentication process resulting in granting or denying access to the residential access network for the at least one station; and wherein upon a granted access the at least one station is automatically connected with the residential access network.

According to the advantageous embodiments of the invention, a computer program in a computer readable format is disclosed comprising the software code for performing the method steps according to any of claims 1 to 13.

According to the advantageous embodiments of the invention, a non-transitory program storage device readable by a computer, tangibly embodying a program of instructions executable by the computer to perform the method steps according to any of claims 1 to 13 is disclosed.

BRIEF DESCRIPTION OF THE DRAWINGS

Preferred embodiments of the invention are explained in more detail below by way of example with reference to the schematic drawings, which show in.

Similar or same elements are referenced with the same reference numbers.

DESCRIPTION OF EMBODIMENTS

It will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

Figure 1:
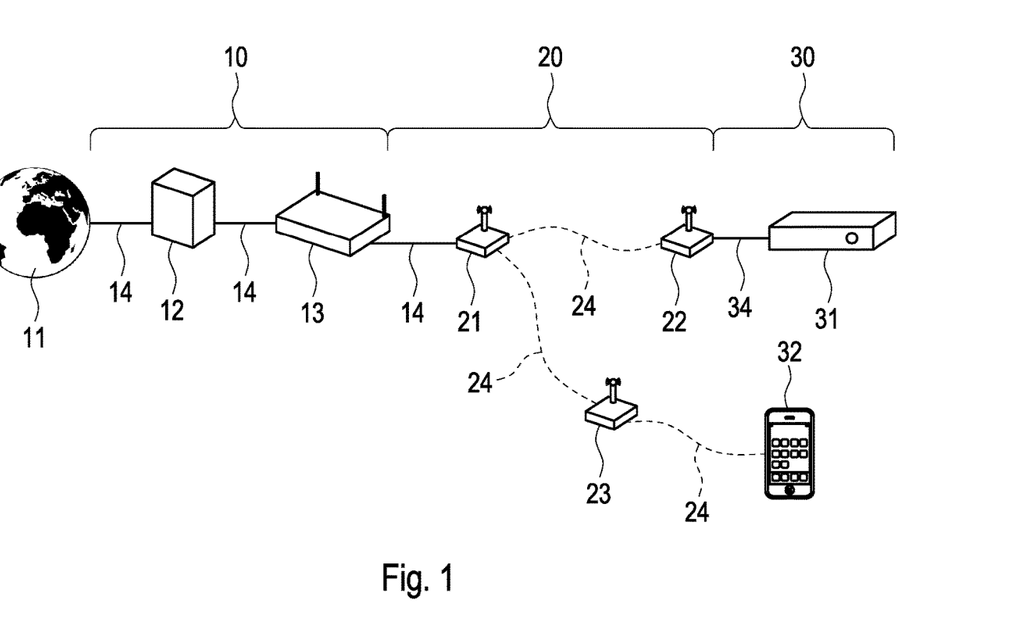
FIG. 1 a schematic diagram of common, modern residential network architecture.

Referring to FIG. 1, a common, modern residential network architecture is illustrated. The illustrated network architecture includes a broadband (BB) access network 10, a wireless residential access network 20, and end user devices 30. The broadband access network 10 may include the internet 11, a telecom internet access gateway (GW) 12, and a broadband gateway (BBGW) 13 that are connected with each other by a broadband link 14. The residential access network 20 may include an access point (AP) 21 and a station (STA) 22. Additionally, the residential access network 20 may include a repeater (RE) 23. More than one access point 21, station 22, and/or repeater 23 may be used in the residential access network 20. The access point 21 can be connected with the broadband gateway 13 via a broadband link 14 or a LAN connection. The station 22 and the repeater 23 can be connected with the access point 21 via a WLAN link 24. End user devices 30 may include a set-top box (STB) 31 and end user equipment (UE) 32. A set-top box (STB) is an information appliance device that generally contains a TV-tuner input and displays output which connects to a television set and an external source of signal, turning the source signal into content in a form that can then be displayed on the television screen or other display device. The end user equipment 32 may include, for example, desktop and/or laptop computer, tablets, mobile phones, etc. The set-top box 31 can be connected with the station 22 via an Ethernet link 34. The end user equipment 32 can be connected with the access point 21 directly or with a repeater 23 via a WLAN link 24.

Figure 2:
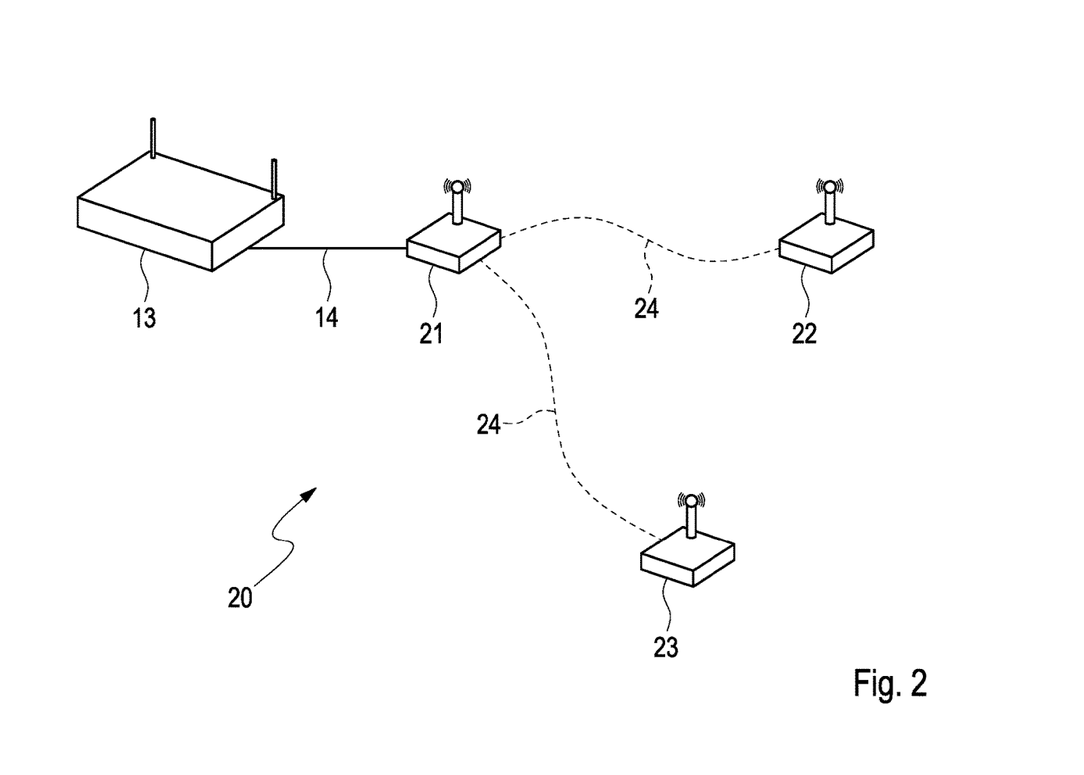
FIG. 2 a schematic diagram of an exemplary wireless residential access network in accordance with an embodiment of the invention.

Referring to FIG. 2, an exemplary wireless residential access network 20 is illustrated in accordance with an embodiment of the invention. The residential access network 20 may be part of the network architecture shown in FIG. 1. As a minimum, the residential access network 20 includes an access point 21 and a station 22, but modern installations often also include at least one repeater 23.

An operator, such as a telecom operator, acts typically as a service provider, delivering not only the broadband access service but also services like, for example, but not limited to, voice over internet protocol (VoIP), internet protocol television (IPTV), video on demand (VoD), or home security to an end user. To enable these services, a wireless residential access network, such as the network 20, is needed. Such a residential access network 20 can be either owned by the operator or the end user may be obliged to purchase networking equipment, such as the access point 21, the station 22, and/or the repeater 23, from the operator as the hardware and software components of the network (20) are specifically designed and/or optimized for delivering the services offered by the operator.

To keep the cost low for an operator, all devices of the networking equipment of the residential access network 20, such as the access point 21, the station 22, and/or the repeater 23, are preferably identical and can assume different operational roles. If all devices are identical, they cannot be pre-paired. By assigning a different operational role to each of the devices, each device is turned into a unique device, provisioned with a default set of access point credentials.

If, for example, the station 22 should be paired with the access point 21, the station 22 needs to know the service set identifier (SSID) and the Wi-Fi protected access with a pre-shared key (WPA(2)-PSK) in order to do so, which is typically not the case at default installation. To allow the station 22 to pair with the access point 21, the station 22 needs to be authorized and authenticated. Generally in WLAN networks there is no extra authorization as it is assumed that the manual action of the end user is a form of authorization. With an automatic installation however this step needs to be added in order to remove the need of manual end user interaction to perform some form of authorization. This authorization is needed to avoid pairing devices from a different residential access network, for example the network of a neighbor, with the access point 21 and, thus the broad band gateway 13 of a current network, which could lead to an issue or misconfiguration in the current residential access network 20.

An automatic configuration of the devices of the residential access network 20, such as the station 22 and/or the repeater 23, could work as follows. In a first step, each device that has the STA operational role assigned sends out periodical probe requests to connect to a preconfigured service set identifier (SSID), for example, named "OPERATORMAINTENANCE". This SSID can be a WPA(2)-residential encrypted SSID or a WPA2 (Wi-Fi protected access) for which all stations 22 have the credentials. The residential access network 20 could be described as a maintenance network in this example. The probe requests should only be sent when there is no other connection profile present in the station 22, hence, when the station 22 is in a "first use" state. Important is that the network will not always be enabled. For security reasons the network should only be enabled once specific probe requests with SSID=OPERATORMAINTENANCE are received by the access point 21 of the residential access network 20. Upon reception of at least 5 consecutive probe requests from a station 22, the access point 21 will start the authorization procedure, which will result in the activation of an extra basic service set identifier (BSSID) based on which maintenance or auto-pairing can be realized. For practical reasons the SSID "OPERATORMAINTENANCE" should be operated as a non-broadcasting or hidden network. In that way, it will not show up on simple network scanners and create confusion during connection of regular, non-operator owned equipment, such as end user devices 30. Prior to enabling the maintenance SSID the access point 21 must have received all necessary information in the form of a list of media access control (MAC) addresses or serial numbers. In that way the access point 21 will be provisioned and no further back-end communication will be required.

When the BSSID is active, the SSID is up, all stations 22 will automatically pair with the access point 21. However, the access point 21 may need to restrict access to the internet, since not all devices, such as stations 22 and/or repeaters 23, of the residential access network 20 may be known to the access point 21. In order for the access point 21 to be able to select the devices to be connected to internet via the specific broadband gateway 13 at a given end user's location, the allowed devices must be known to the access point 21.

Figure 3:
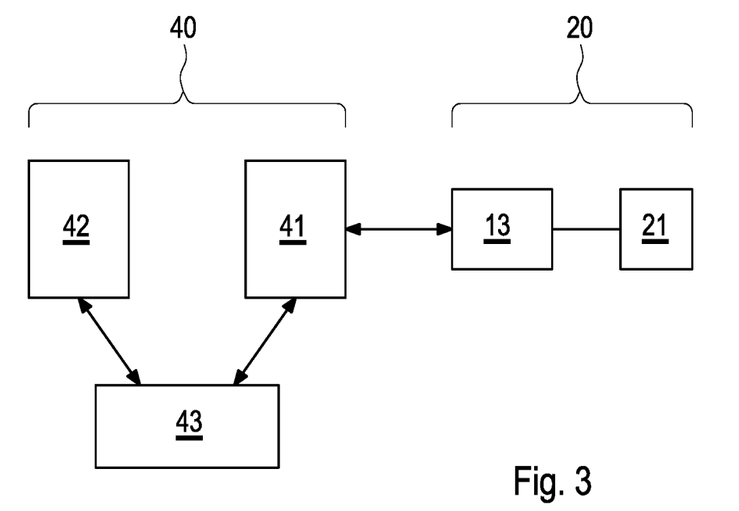
FIG. 3 a schematic diagram of a back-end network in accordance with an embodiment of the invention.

Referring to FIG. 3, a back-end-network 40 is illustrated in accordance with an embodiment of the invention. The back-end-network 40 may include an auto configuration server (ACS) 41 for executing a remote management protocol, such as TR-069, an end user data base 42 of an operator, and an authorization daemon 43 that allows communication between the auto configuration server 41 and the end user data base 42. The authorization daemon 43 is in accordance with embodiments of the invention a (computer) process that runs on a server that has access to both the end user data base 42 and the remote management data model running on the ACS 41.

For ease of explanation the following examples will focus on TR-069, but a Simple Network Management Protocol (SNMP)-based approach may be equally viable. The TR-069 CPE WAN Management Protocol (CWMP) was created by the Broadband Forum (BBF) to standardize the Wide Area Network (WAN) management via CWMP. The TR-069 protocol specifically defines a common method for customer premises equipment (CPE) devices, such as the access point (AP) 21, the station (STA) 22 and/or the repeater (RE) 23, to communicate with an Auto Configuration Server (ACS) 41.

Figure 4:
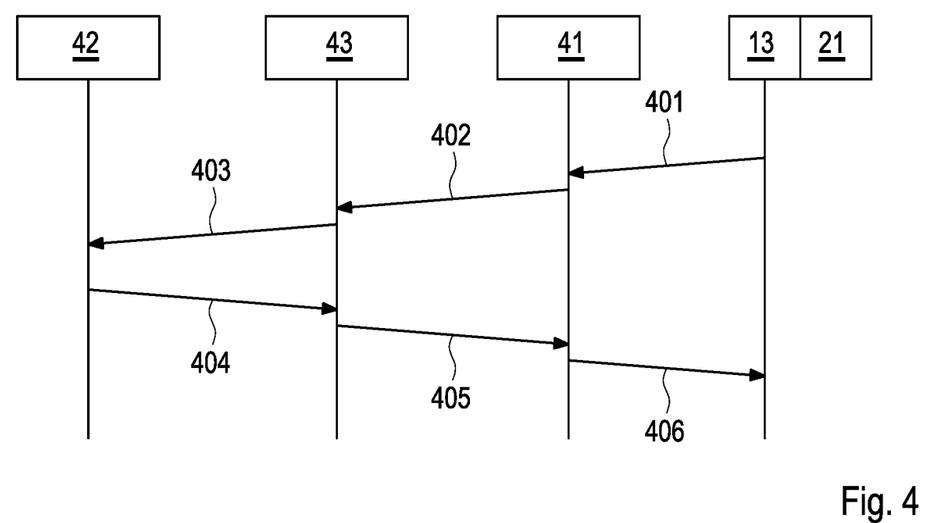
FIG. 4 a flowchart illustrating an authorization process using the back-end network of FIG. 3 in accordance with an embodiment of the invention.

Referring to FIG. 4, an automatic authorization process using the back-end-network 40 shown in FIG. 3 is illustrated in accordance with an embodiment of the invention. Prior to enabling the "OPERATORMAINTENANCE" SSID, the access point 21 will send an active inform message to the TR-069 ACS 41 (or SNMP management information base, alternatively) informing that a maintenance or installation action is ongoing and that support is required, in a step 401. The access point 21 can do this directly by using BBF TR-114 or indirectly via the Broadband Gateway (BBGW) 13 it is connected to.

The TR-069 ACS 41 may be monitored by the authorization daemon 43. The active inform may toggle the interface state value to "up" for the data model parameter representing the OPERATORMAINTENANCE SSID, for example:

InternetGatewayDevice.LANDevice.WLAN
   Configuration.1.Status

If the authorization daemon 43 recognizes this event, the authorization daemon 43 will recognize that the access point 21 is operational in a step 402 and will start the process of figuring out, if the devices, such as the station (STA) 22 and/or the repeater (RE) 23, that are connected to the access point 21 that requests authorization, are effectively allowed or not.

To realize that, the authorization daemon 43 connects to the end user data base 42 of the operator and queries the end user data base 42 for allowed devices, in a step 403. All operators can track the purchase of new subscriptions and new equipment in an end user data base 42 that is linked to the customer ID of the end user. Each time a customer makes a purchase from the operator, the device, such as the station (STA) 22 and/or the repeater (RE) 23, is added to the end user data base 42, linked to the customer's (the end user's) ID.

For example, an end user data base 42 could be structured as follows:
User_id [master key in the data base]
Device type=device_id
Serial number=xxyyzzaabbccdd
MAC_1=aa:bb:cc:dd:ee:ff
MAC_2=aa:bb:cc:dd:ee:ff The device_id typically represents the devices provided by the operator, such as network bridges, wireless network bridges, set-top boxes (STB) 31, or broadband gateways (BBGW) 13. The serial number is the serial number allocated to the device, which generally specifies which media access control (MAC) addresses are allocated to a specific device. The presence of the MAC addresses may facilitate the implementation but may be optional, while the presence of the serial number is mandatory. Thus, for the illustration of the concept of authorization via the operator's end user data base 42 the device serial number will be used.

Accordingly, the authorization daemon 43 will launch a query in the end user data base 42 for the MAC address of the BBGW 13 that is installed at the end user, in the step 403. During this query, the user_id will first be retrieved, which then enables a query of the complete record of purchased devices based on the user_id. As a result, the end user data base 42 will send the allowed serial numbers to the authorization daemon 43 in a step 404. In a following step 405, the authorization daemon 43 may instruct the auto configuration server (ACS) 41 to allow additional devices based on the data received in step 404. Therefore, the auto configuration server (ACS) 41 may act as a remote management entity. Furthermore, in accordance with further embodiments of the invention, there may be alternative ways to identify an end user, for example, via a PPP (point-to-point-protocol) account. Which method is used is irrelevant to the principle of operation as described or the concept of the embodiments of the invention.

The auto configuration server (ACS) 41 acting as a remote management server will install a list of unique device identifiers (such as the serial numbers) in the access point 21, in a step 406. Hence, the access point 21 knows which devices are allowed on the residential access network 20. The ACS 41 may store the serial numbers, for example, as comma-separated string block in a TR-098 or TR-181 data model parameter, such as:
InternetGatewayDevice.LAN
Device.X_000E50_AllowedLANDevices.

The principle of using such "authorized devices list" can also be applied to non-WLAN devices that connect to the BBGW 13.

The access point 21 handling the OPERATORMAINTENANCE BSSID now has accurate information with respect to which devices are allowed on the residential access network 20. The access point 21 is now fully provisioned to handle the association of several stations 22 and, hence, enables the BSSID.

With the BSSID enabled, all stations 22 connect immediately, since the credentials for the OPERATORMAINTENANCE network have been pre-installed in each of those devices. Accordingly, the access point 21 has now used the newly acquired information to allow a station 22 to connect or not.

Figure 5:
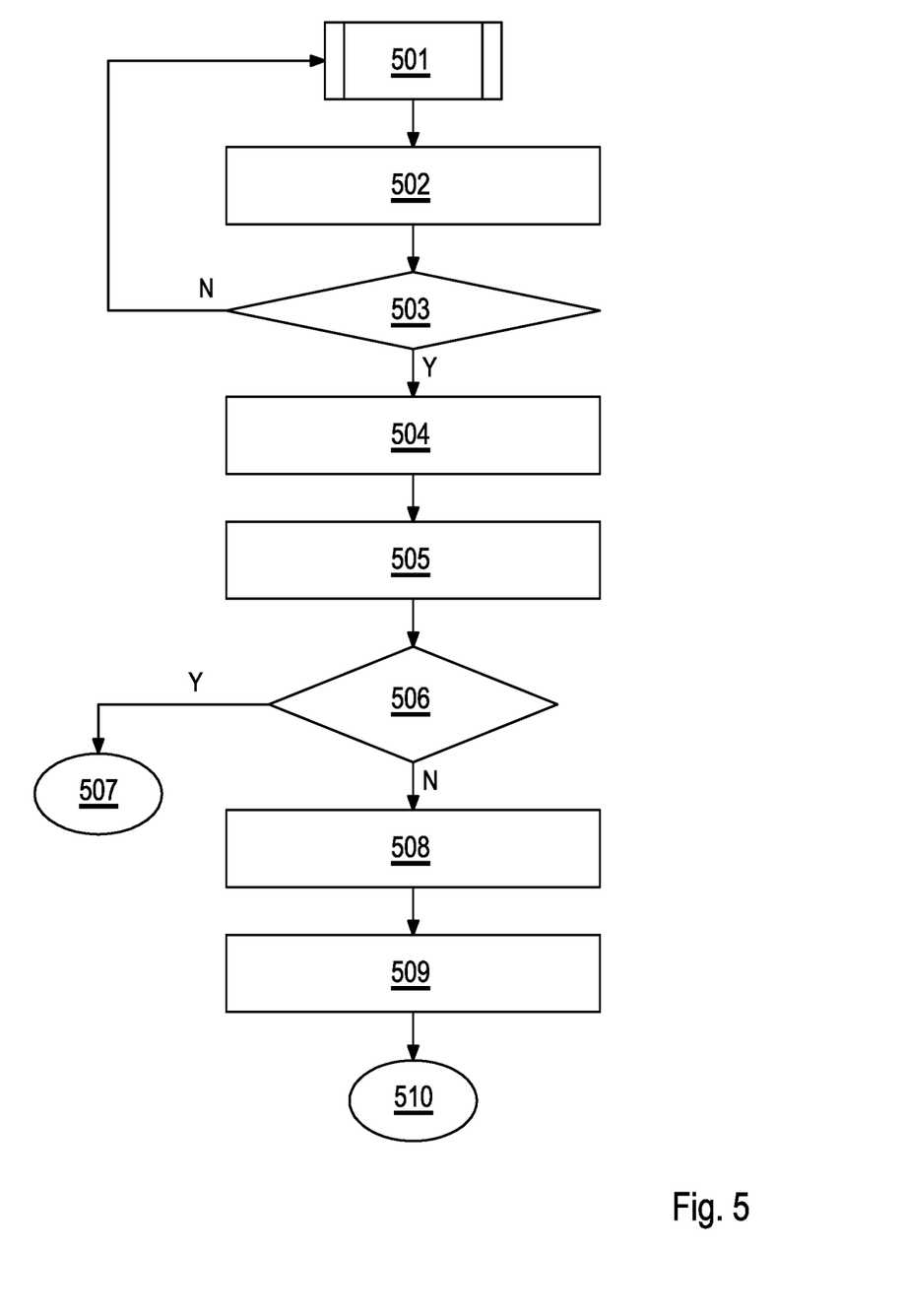
FIG. 5 a flowchart illustrating an authentication process in accordance with an embodiment of the invention.
Figure 6:
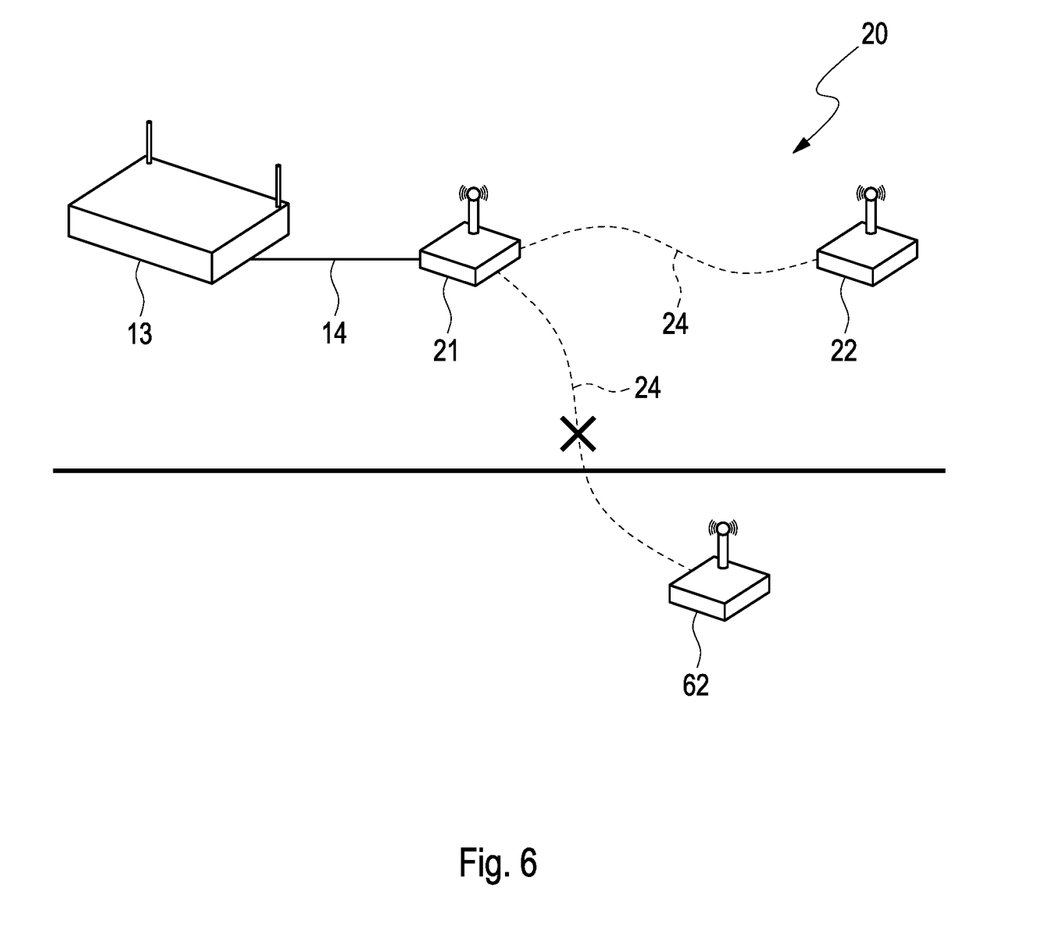
FIG. 6 a schematic diagram of exemplary residential network architecture in accordance with another embodiment of the invention.

Referring now to FIG. 5, an authentication process is illustrated in accordance with an embodiment of the invention. Essential to the automatic authorization process described in connection with FIG. 4 is that each station 22 announces its identity (identity=serial number). By announcing itself in a step 501, a station 22 can launch a simple connection state mechanism or authentication process, as illustrated in FIGS. 5 and 6, which expects the correct feedback from the access point 21. In a step 502, the station 22 periodically sends out a probe request for SSID=OPERATORMAINTENANCE until the station 22 receives a probe response from the access point 21, in a step 503. Once the station 22 received a probe response from the access point 21, a connection with the access point 21 is initiated in a step 504. In a step 505, the station 22 communicates the identity=Serial NR to the access point 21. The access point 21 may then authorize the connection within a configurable response window in a following step 506, which would end the process (507).

In case the right feedback is not received, the station 22 will disconnect from the residential access network 20 automatically in a step 508. This autonomous disconnection initiated by the station 22 is an essential feature of the authentication process in accordance with an embodiment of the invention, as it may prevent a typical so called honey pot attack, whereby a rogue access point of an attacker mimics the access point 21 thereby allowing one or more stations 62 that do not belong to the operator of the residential access network 20, such as a neighbors' station, to automatically connect to the rogue access point, as illustrated in FIG. 6. In accordance with an exemplary embodiment of the invention, the station 62 needs the feedback from the access point 21 or it will stop the connection. The attacker is likely not able to run the authentication and, hence, the station 62 will break the connection with the rogue AP (step 508). Optionally, the access point 21 may signal a denial to connect to residential access network 20 to the station 62 to properly terminate the authentication. Preferably, the access point 21 will blacklist the station 62, hence, breaking the connection and preventing re-association of that specific station in a step 509. Once all stations 22 in the association table of the access point 21 have been handled, the access point 21 can disable the OPERATORMAINTENANCE BSSID in a step 510 and end the authentication process.

Figure 7:
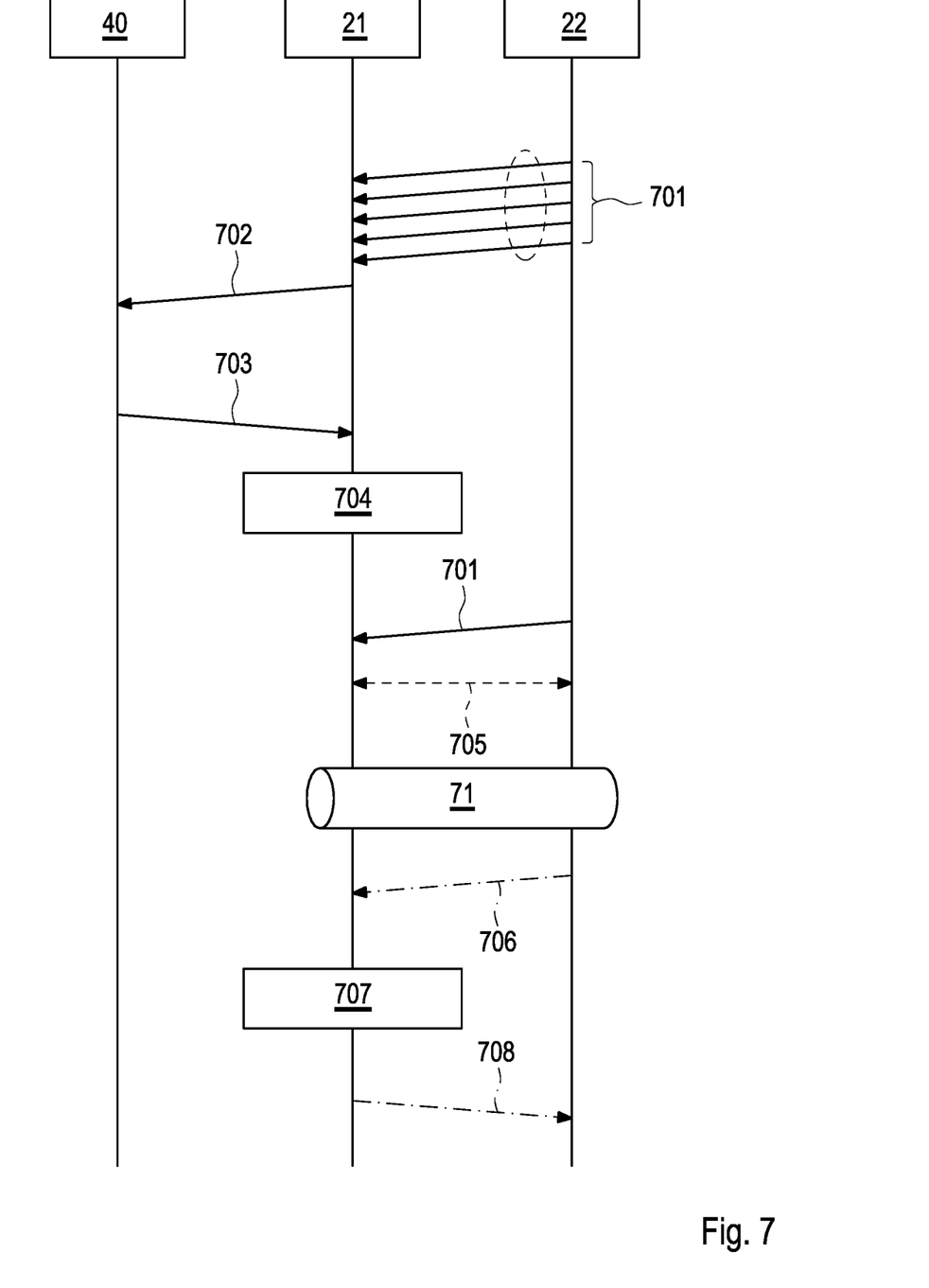
FIG. 7 a flowchart illustrating an authorization process in combination with an authentication process in accordance with an embodiment of the invention.

Referring now to FIG. 7, an automatic authorization process in combination with an authentication process is illustrated in accordance with an embodiment of the invention. In a step 701, the station 22 periodically sends out a probe request for SSID=OPERATORMAINTENANCE. The access point 21 announces a new station to the back-end-network 40 and, thus, the ACS 41 in a step 702. In accordance with the automatic authorization process shown in FIG. 4, the ACS 41 provides a list of devices allowed in the residential access network 20 in a step 703, e.g. identifiable by their respective serial numbers. The OPERATORMAINTENANCE SSID will now be enabled at the access point 21, in a step 704. Upon receiving another probe request SSID=OPERATORMAINTENANCE from the station 22 (step 701), an association between access point 21 and the station 22 is established in a step 705 and an encrypted tunnel 71 may be established. In a following step 706, the station 22 may announce its identity to the access point 21, e.g. its serial number. When the access point 21 receives the identity of the station 22, access point 21 can look up the serial number of the station 22 in the list of allowed devices it received in step 703 and validate the identity of the station 22 in a step 707. Based on a potential match, the access point 21 will deliver a decision to the station 22 in a step 708 either granting or denying connection to the residential access network 20. As can be seen, all the end user had to do in order to initiate the authorization process and the authentication process in accordance with an embodiment of the invention, is to power on all devices, in the given example, the access point 21 and the station 22.

Adding non-provider owned devices, such as the end user equipment 32, as shown in FIG. 1, can still be done via the classical way, by using Wi-Fi protected setup (WPS) or manual installation of network keys. The main difference is that non-provider owned devices will pair with the public basic service set identifier (BSSID) and not with the maintenance one. A device owned by the network operator can also still be paired in the classical way without causing an issue, as the access point 21 still accepts WPS sessions or manual configurations on the regular BSSID.

Figure 8:
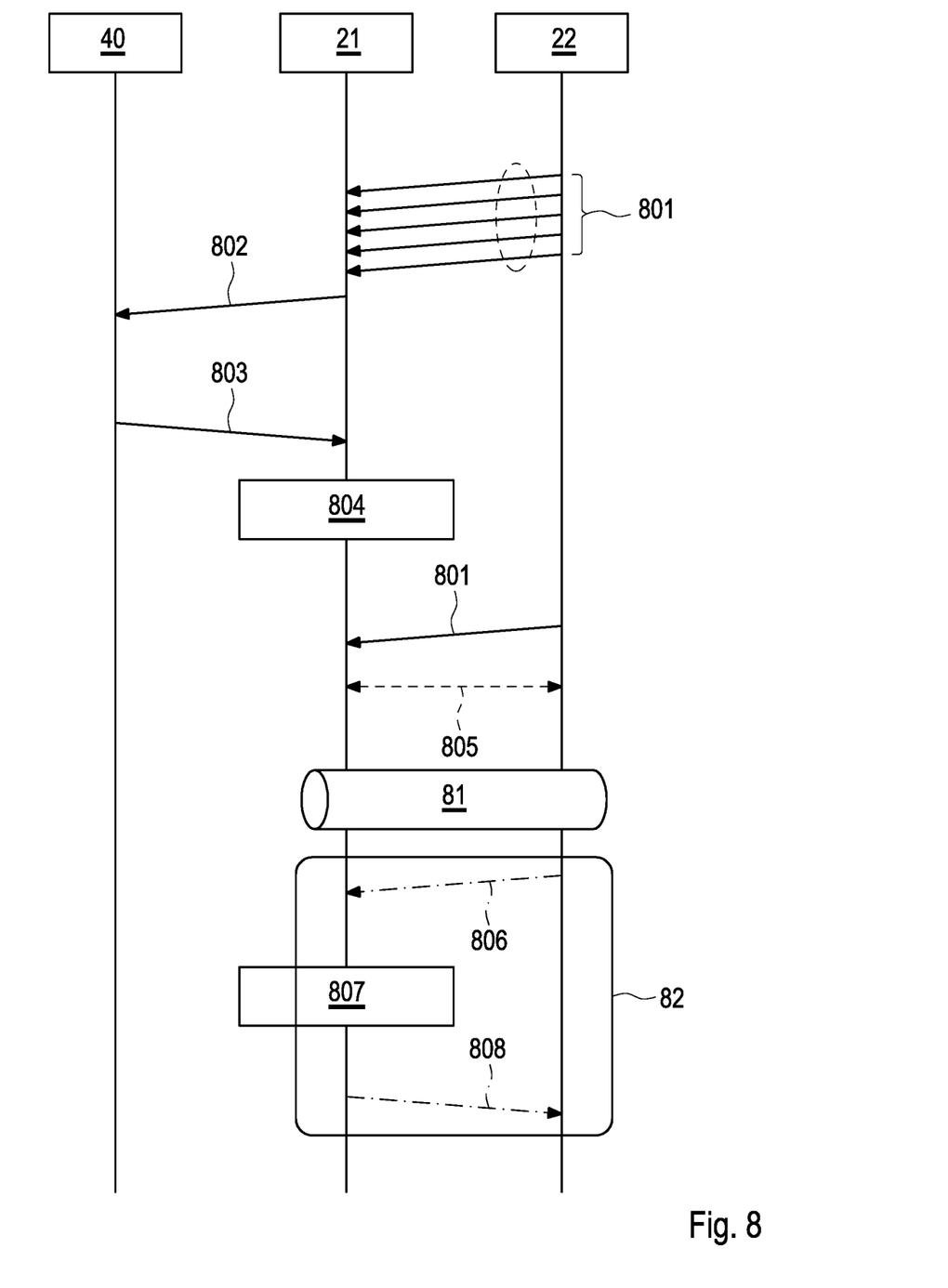
FIG. 8 a flowchart illustrating an authorization and authentication process utilizing action frames in accordance with an embodiment of the invention.

Referring to FIG. 8, an authorization and authentication process utilizing action frames is illustrated in accordance with an embodiment of the invention. In this example, action frames 82, such as protected management frames (PMF) encrypted vendor specific action frames, are utilized to present the identity and grant or deny access.

This system, whose authorization flow is illustrated in FIG. 8, presumes that the access point 21 uses a PMF-based WPA2 (Wi-Fi protected access) handshake or encrypted link 81 to setup the WLAN (wireless local area network) link. The advantage of using PMF is that vendor proprietary WLAN (IEEE 802.11) action frames are also being encrypted with a unicast per device AES-CCMP (advanced encryption standard) key. Hence leaving little room to spoof or eavesdrop on the link. In the example operator-proprietary IEEE 802.11 action frames are used (e.g. OUI (organizational unique identifier)). Three types of action frames 82 need to be created, one for identifying the station 22, one for allowing access, and one for denying access. Various action frame structures may be applicable.

In a step 801, the station 22 periodically sends out a probe request for SSID=OPERATORMAINTENANCE. The access point 21 announces a new station to the back-end-network 40 and, thus, the ACS 41 (not shown) in a step 802. In accordance with the automatic authorization process shown in FIG. 4, the ACS 41 provides a list of devices allowed in the residential access network 20 in a step 803. The OPERATORMAINTENANCESSID will now be enabled at the access point 21, in a step 804. Upon receiving another probe request SSID=OPERATORMAINTENANCE from the station 22 (step 801), an association between access point 21 and the station 22 is established in a step 805 and a WPA2 encrypted link 81 may be established. The station 22 will use an "identify station" action frame 82 to announce its identity in a step 806 once the WPA2 link 81 has been established. In the "identify station" action frame 82, the station 22 will include its serial number (potentially encrypted). The access point 21 decodes the action frame 82 and validates the serial number, in a step 807. The station 22 is thus identified in step 807 by the access point 21. In a following step 808, the access point 21 will issue an ALLOW action frame 82 or DENY action frame 82. The station 22 will react on the action frame received as described earlier (ALLOW meaning no action, DENY meaning break connection).

Figure 9:
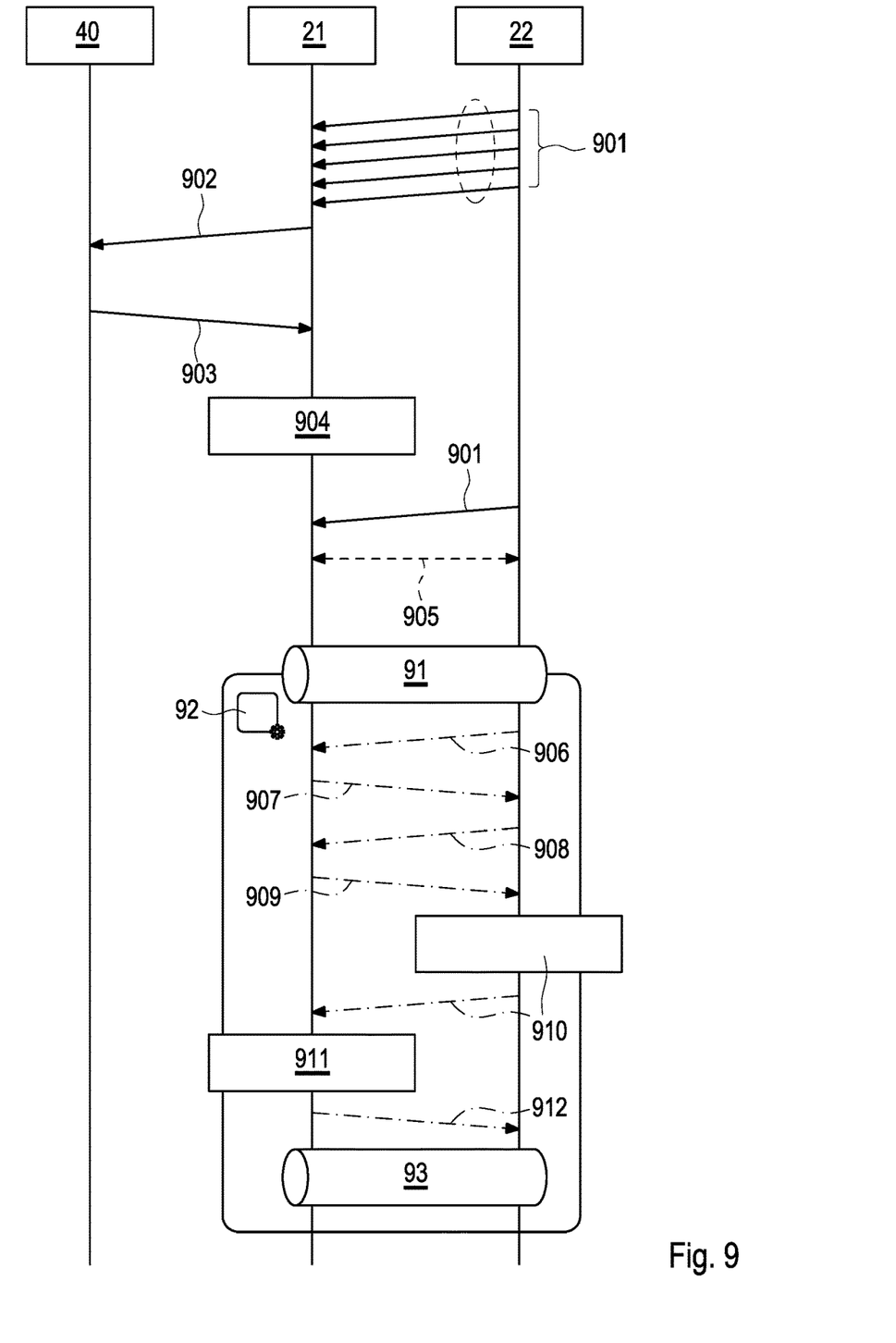
FIG. 9 a flowchart illustrating an authorization and authentication process utilizing WAP2-enterprise in accordance with an embodiment of the invention.

Referring to FIG. 9, an authorization and authentication process utilizing WAP2-enterprise is illustrated in accordance with an embodiment of the invention. In this example, WPA2 (Wi-Fi protected access) enterprise with PEAP (protected extensible authentication protocol) (and MSCVHAPv2 or MD5) is utilized to gain access to the residential access network 20.

In a step 901, the station 22 periodically sends out a probe request for SSID=OPERATORMAINTENANCE. The access point 21 announces a new station to the back-end-network 40 and, thus, the ACS 41 (not shown) in a step 902. In accordance with the automatic authorization process shown in FIG. 4, the ACS 41 provides a list of devices allowed in the residential access network 20 in a step 903. The OPERATORMAINTENANCE SSID will now be enabled at the access point 21, in a step 904. Upon receiving another probe request SSID=OPERATORMAINTENANCE from the station 22 (step 901), an association between access point 21 and the station 22 is established in a step 905.

After association in step 905, an encrypted tunnel 91, such as PEAP with MSCVHAPv2 or MD5, is setup between the WPA supplicant of the station 22 and the hostapd of the access point 21 over which the authentication takes place. A hostapd is a user space daemon for access point and authentication servers. Internet protocol (IP) connectivity is not needed in this example, since this is all L2 traffic. An internal IEEE802.1x server 92 may be provided. Upon connection, the station 22 requests access in a step 906 and the access point 21 requests the station 22 to provide its identity in a step 907. The station 22 replies in a step 908. In a following step 909 the access point 21 may challenge the access and the station 22 replies in a step 910 using a PEAP method, whereby the username is the product name and the password is the serial number. The 802.1x authenticator of the access point 21 then contacts the list of allowed serial numbers in the gateway data model in a step 911 and sends either an access-accept or access-reject message back to the supplicant of the station 22 in a step 912. Upon reception of an access-accept, the WPA2 session is handled further and a secure AP-STA link 93 between the access point 21 and the station 22 is established. Upon reception of an access-reject message the 802.1x supplicant of the station 22 will instruct the station 22 to break the connection and blacklist the BSSID.

Figure 10:
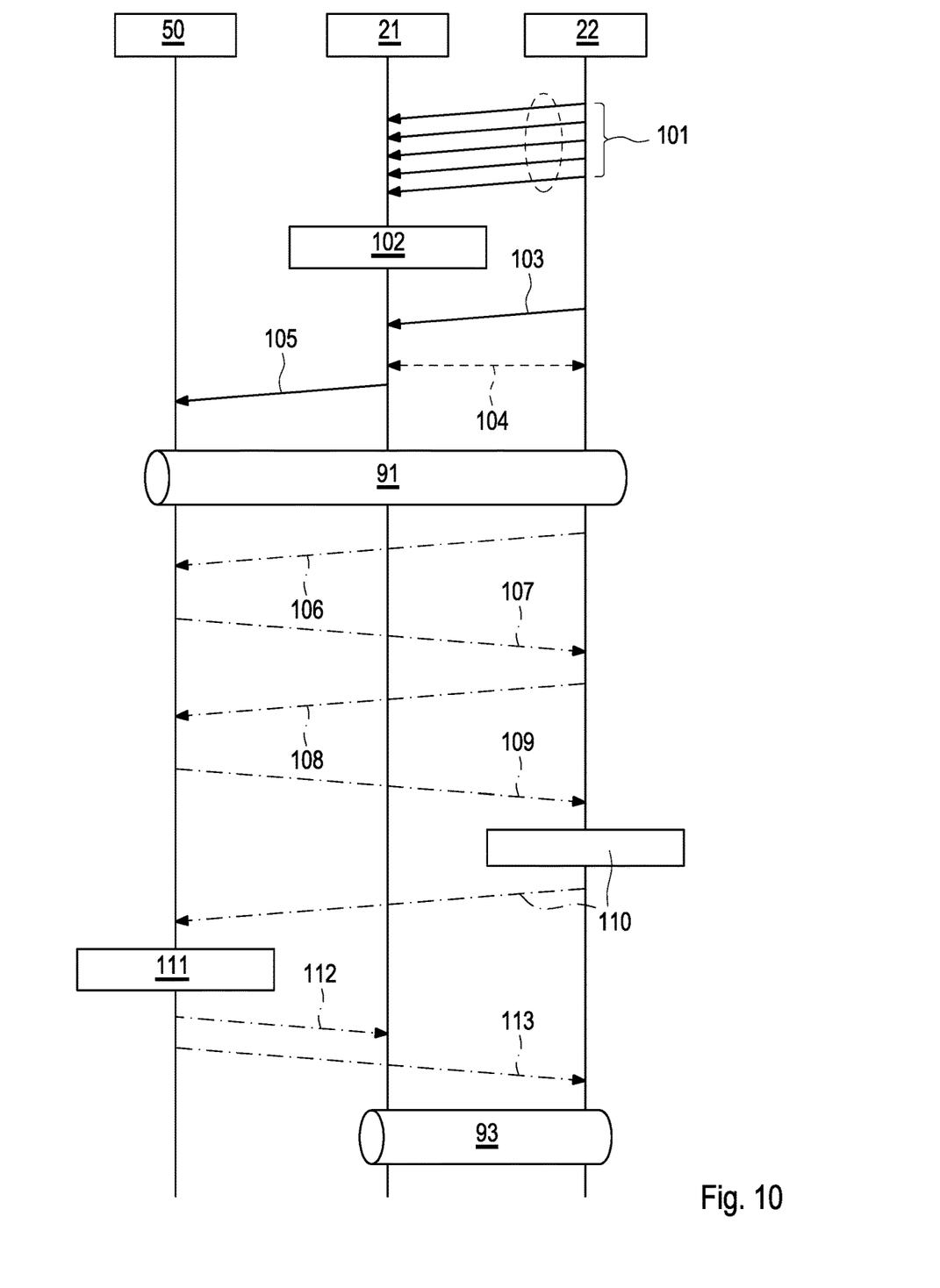
FIG. 10 a flowchart illustrating an authorization and authentication process utilizing WAP2-enterprise in accordance with another embodiment of the invention.

Referring to FIG. 10, an authorization and authentication process utilizing WAP2-enterprise is illustrated in accordance with an embodiment of the invention where the broadband gateway (BBGW) is not owned by the operator deploying the residential access network 20. This alternative embodiment is an example covering most of the satellite television installations. In a typical satellite television installation the satellite set-top-box (STB) 31 is connected behind a generic broadband gateway (BBGW) that is not owned by the operator of the satellite service. If this operator wants to install multiple STBs 31 that can stream content to each other the exemplary approach as shown in FIG. 10 approach can be utilized.

Figure 11:
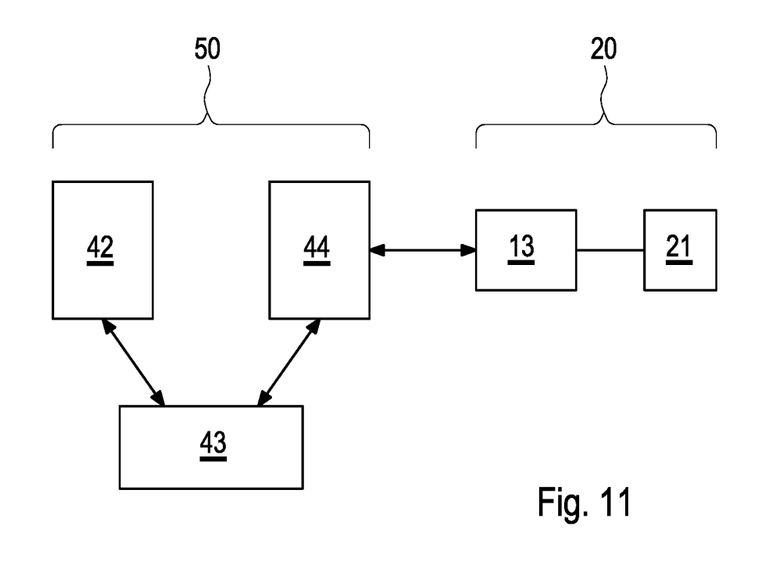
FIG. 11 a schematic diagram of a back-end network in accordance with another embodiment of the invention.

For this example, the back-end-network 40 illustrated in FIG. 3 must be modified, as illustrated in FIG. 11. As can be seen, in the back end-network 50 the auto configuration server (ACS) 41, as shown in FIG. 3, has been replaced with a radius server 44.

When a new station 22 tries to join a residential access network 20, the access point 21, which preferably has been preconfigured with the IP address of the correct radius server 44 or FQDN and matching radius secret, will initiate an IEEE802.1x session, which may be tunneled through the BBGW 13, with the radius server 44 of the satellite network operator. The radius server 44 communicates with the end user database 42 via the authorization daemon 43, allowing the radius server 44 to verify the identity of the access point 21 and the stations 22 that are trying to connect. One or more stations 22 may try to connect. The access point 21 identity is verified by the radius server 44 by comparing the list of retrieved serial numbers to the value of AVP 32 (NAS-IDENTIFIER (network attached storage identifier), defined in RFC 2865 (request for comments)). This is a device unique string, which should reflect the serial number of the access point 21 that may be, for example, concatenated with the product name. The identity of the station 22 is validated in a similar way as the previous WPA2-enterprise example illustrated in FIG. 9, namely by looking at the value of the username/password combination (e.g. PEAP/MSCHAPv2 is used in this case).

Referring again to FIG. 10, in step 101, the station 22 periodically sends out a probe request for SSID=OPERATORMAINTENANCE. The OPERATORMAINTENANCE SSID will be enabled by the access point 21, in a step 102. Upon receiving another probe request SSID=OPERATORMAINTENANCE from the station 22 in a step 103, an association between access point 21 and the station 22 is achieved in a step 104. In a following step 105, an IEEE 802.1x connection is set up between the access point 21 and the back-end-network 50 and, thus, the radius server 44 (not shown). An encrypted tunnel 91, such as PEAP with MSCVHAPv2 or MD5, over which the authentication can take place, is then setup between the radius server 44, the access point 21, and the station 22. Upon connection, the station 22 requests access in a step 106 and the radius server 44 requests the station 22 to provide its identity in a step 107. The station 22 replies in a step 108. In a following step 109 the radius server 44 may challenge the access and the station 22 may reply in a step 110 using a PEAP method, the username being the product name and the password being the serial number. The radius server 44 will then contact the list of allowed serial numbers in the gateway data model in a step 111 for validation of the credentials of the station 22, and send either an access-accept or access-reject message to the access point 21 in a step 112 and to the station 22 in a step 113. Upon reception of an access-accept, the WPA2 session is handled further and a secure AP-STA link 93 between the access point 21 and the station 22 is established. Upon reception of an access-reject message the 802.1x supplicant of the station 22 will instruct the station 22 to break the connection and blacklist the BSSID.

By using this alternative approach a residential access network 20 can be set up automatically behind a third-party network that is not controlled by the operator that wants to deploy the residential access network 20.

Various other authorization and authentication processes can be executed in a similar way enabling the automatic configuration of all WLAN devices owned by an operator of a residential access network, such that the only task left for an end user is to turn on the operator owned devices of the network.

REFERENCE SIGNS LIST

10 broadband (BB) access network
11 internet
12 telecom internet access gateway (GW)
13 broadband gateway (BBGW)
14 broadband link
20 wireless residential access network
21 access point (AP)
22 station (STA)
23 repeater (RE)
24 WLAN link
30 end user devices
31 set-top box (STB)
32 end user equipment (UE)
34 Ethernet link
40 back-end network
41 auto configuration server (ACS)
42 end user data base
43 authorization daemon
44 radius server
50 back-end network
62 station (neighbors' station)
71 encrypted tunnel
81 WPA2 encrypted link
82 action frames
91 encrypted tunnel
92 internal IEEE802.1x server
93 AP-STA link
101-113 method step
401-406 method step
501-510 method step
701-708 method step
801-808 method step
901-912 method step

CITATION LIST

Patent Literature

1. EP 1 520 375 B1, Whelan et al., granted Dec. 23, 2009
2. WO 2012/084626 A1, Aranda Gutierrez, published Jun. 28, 2012
3. IN 2012 202521 P4, Lan, published May 10, 2013

The invention claimed is:

1. A method of operating a wireless local area network, WLAN, access point for automatically allowing or denying a wireless network device to access the WLAN, the method comprising at the access point:

receiving probe requests from the wireless network device, the probe requests probing for a wireless network identified by a service set identifier that is not broadcasted by said access point;

following said receiving of said probe requests, transmitting a request to a server requesting receipt of a list of identifiers of wireless network devices allowed in the WLAN;

following receipt of a response from the server to said request to said server, said response comprising said list, enabling response to a subsequent probe request from the wireless network device probing for said wireless network identified by said service set identifier that is not broadcasted;

upon receiving said subsequent probe request from the wireless network device, transmitting a probe response to said subsequent probe request to said wireless network device and establishing an association between the access point and the wireless network device;

following said association, receiving from the wireless network device, an identifier of the wireless network device;

following said receipt of said identifier, allowing the wireless network device access to the WLAN according to the received identifier matching with one of the unique identifiers in the list or denying the wireless network device access to the WLAN according to the received identifier not matching with one of the unique identifiers in the list; and disabling response by said access point to probe requests probing for said wireless network identified by said service set identifier that is not broadcasted.

2. The method according to claim 1, wherein the method further comprises, in case of denying the wireless network device access to the WLAN:
- undoing, by said access point, said association established between the access point and the wireless network device; and
- preventing, by said access point, reassociation of the wireless network device.

3. The method according to claim 1, wherein the identifier of the wireless network device comprises at least one of a serial number and a Media Access Control, MAC, address.

4. A wireless access point comprising at least one processor and a memory, a first network interface and a second network interface, said at least one processor being configured to:
- receive, via said first network interface, probe requests from a wireless network device, the probe requests probing for a wireless network identified by a service set identifier that is not broadcasted by said wireless access point;
- upon receipt of said probe requests, to transmit, via said second network interface, a request to a server requesting receipt of a list of identifiers of wireless network devices allowed in the wireless network;
- upon receipt, via said second network interface, of a response from the server to said request to said server, said response comprising said list, to enable response to a subsequent probe request from the wireless network device probing for said wireless network identified by said service set identifier that is not broadcasted;
- upon receipt of said subsequent probe request from the wireless network device, to transmit, via said first network interface, a probe response in reply to said subsequent probe request to said wireless network device and to establish an association between the access point and the wireless network device;
- following said association, to receive, via said first network interface, from the wireless network device, an identifier of the wireless network device:
- following said receipt of said identifier, to allow the wireless network device access to the WLAN according to the received identifier matching with one of the unique identifiers in the list or to deny the wireless network device access to the WLAN according to the received identifier not matching with one of the unique identifiers in the list; and
- to disable response by said access point to probe requests probing for said wireless network identified by said service set identifier that is not broadcasted.

5. The wireless access point of claim 4, wherein the at least one processor is further configured, in case of denying the wireless network device access to the wireless local area network:
- to undo said association established between the access point device and the wireless network device; and
- to prevent reassociation of the wireless network device.

6. The wireless access point of claim 4, wherein the at least one processor is further configured to comprise in the identifier of the wireless network device at least one of a serial number and a Media Access Control, MAC, address.

* * * * *